No. 706,284. Patented Aug. 5, 1902.
A. W. VOLLSTORF.
CAR BRAKE MECHANISM.
(Application filed Nov. 29, 1901.)
(No Model.) 2 Sheets—Sheet 1.
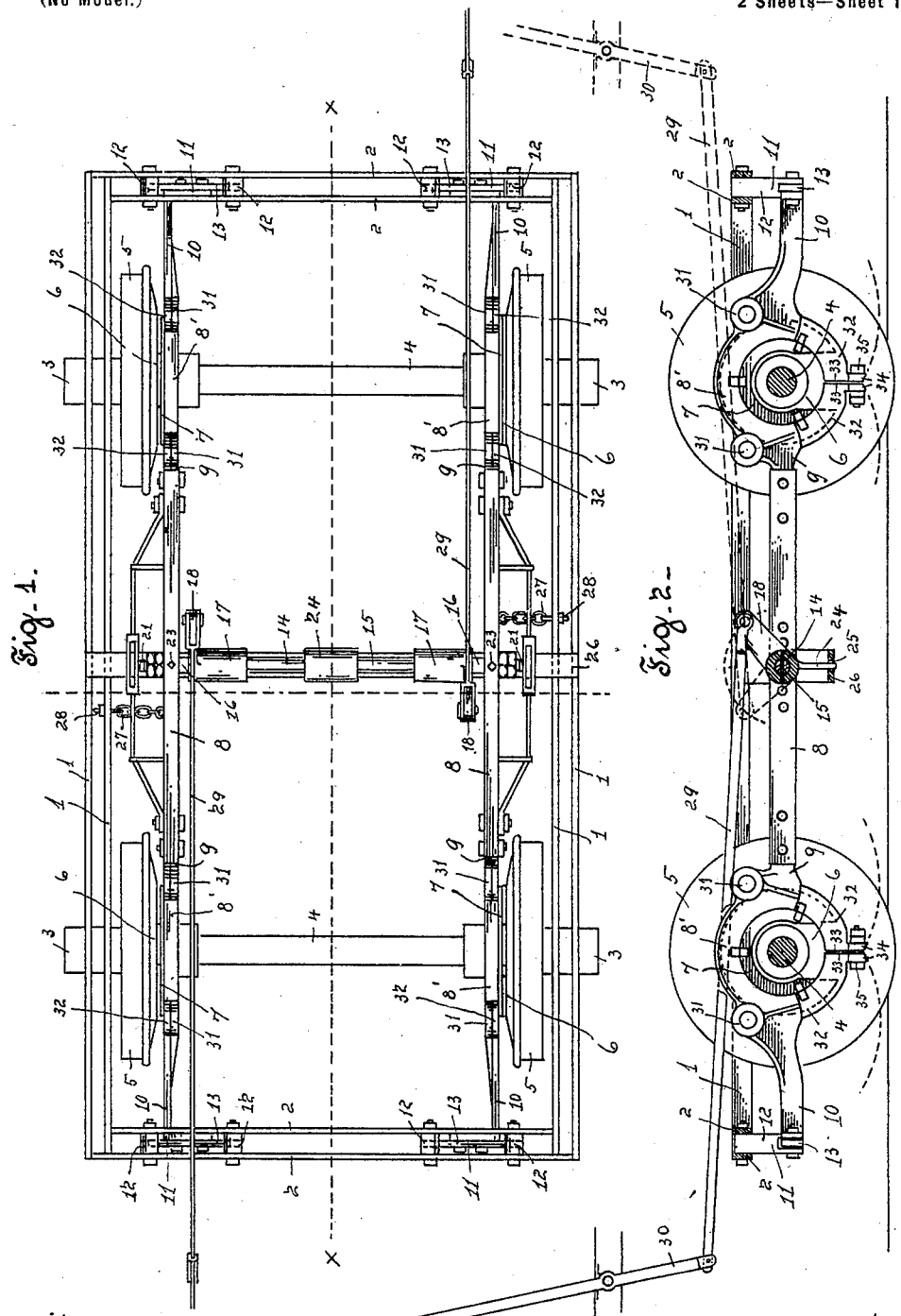

No. 706,284. Patented Aug. 5, 1902.
A. W. VOLLSTORF.
CAR BRAKE MECHANISM.
Application filed Nov. 29, 1901.
(No Model.) 2 Sheets—Sheet 2.
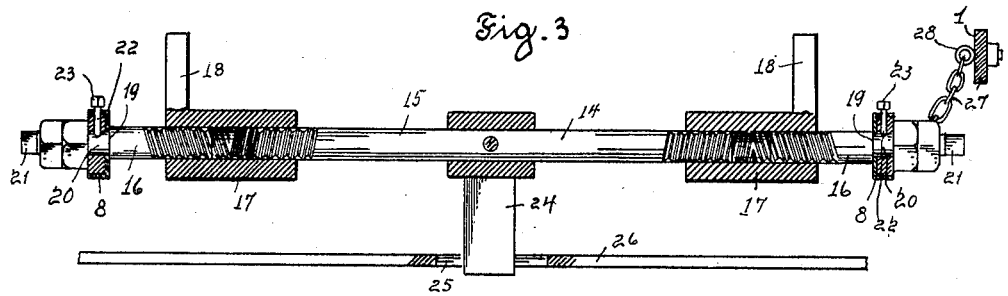
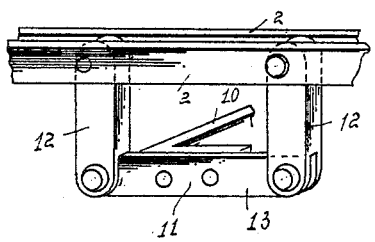
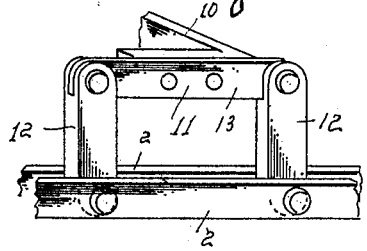
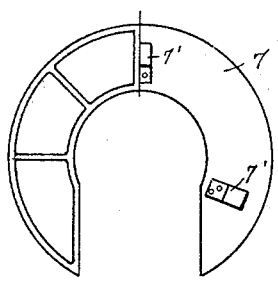
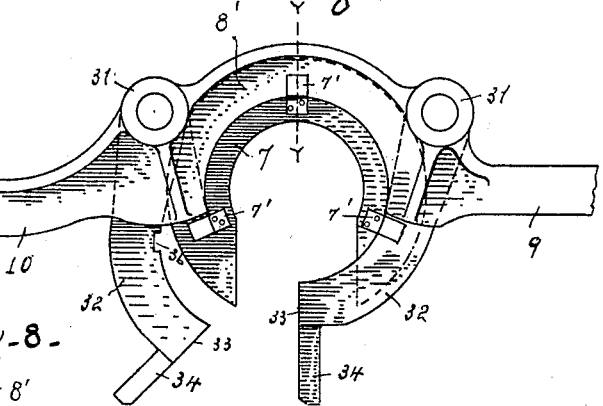
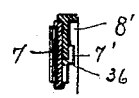
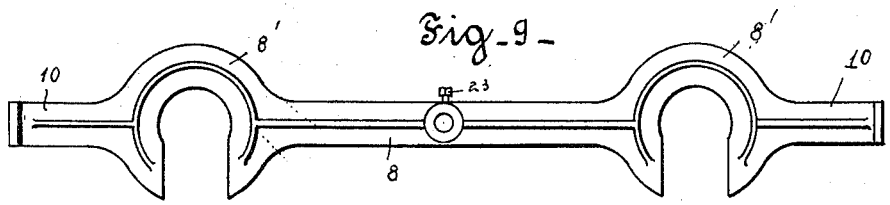
Witnesses—
Chas. A. Boarce
Willust Harmon.
Inventor—
August W. Vollstorf
By Wilson & Martin
his Attorneys.

UNITED STATES PATENT OFFICE.

AUGUST W. VOLLSTORF, OF TOLEDO, OHIO.

CAR-BRAKE MECHANISM.

SPECIFICATION forming part of Letters Patent No. 706,284, dated August 5, 1902.

Application filed November 29, 1901. Serial No. 84,070. (No model.)

*To all whom it may concern:*

Be it known that I, AUGUST W. VOLLSTORF, a citizen of the United States, residing at Toledo, in the county of Lucas and State of Ohio, have invented a new and useful Improvement in Car-Brake Mechanism, of which the following is a specification.

My invention relates to improvements in car-brake mechanism, and more particularly to that class of car-brakes wherein brake-shoes are applied to disks integral with or secured to the webs of the wheels of a car-truck, and has for its objects to increase the power and efficiency of the brake, to adapt it to be operated from either platform of the car independently of its operation from the other platform or from both jointly, that is readily adjustable to take up the wear of the shoes and regulate the throw of the brake-levers, and to movably support the brake mechanism upon the frame of the truck without liability of being shifted from its proper position thereon by the motion of the car. I accomplish these objects by constructing a car-brake and securing it to a truck as hereinafter described, and illustrated in the drawings.

In the drawings, Figure 1 is a top plan view of a street-car truck equipped with a brake constructed in accordance with my invention. Fig. 2 is a longitudinal section through the truck on the line X X of Fig. 1. Fig. 3 is an enlarged view of the extension screw-rod, showing the sectional members thereof in elevation and the coupling-sleeves and supports in section. Fig. 4 is a partial front elevation of the truck-frame, showing links pivotally connected thereto and arranged to pivotally suspend the ends of the brake-bars below the truck-frame. Fig. 5 is a like view showing the bars supported in a like manner above the truck-frame. Fig. 6 is an enlarged elevation of the skeleton frame for the shoe, partially opened and showing the brake-shoe inserted in position therein. Fig. 7 is a plan view showing the obverse and reverse sides of a brake-shoe. Fig. 8 is a section through the skeleton frame and brake-shoe on the line Y Y, Fig. 6; and Fig. 9 shows a modified form of brake-shoe.

The truck-frame illustrated in the drawings is of the usual construction and comprises the side frame members 1 and the end frame members 2, the whole frame being secured to and suitably supported from the journal-boxes 3, which are mounted upon a pair of car-axles 4. Upon each axle there is mounted a pair of flanged wheels 5, each of which is provided with a friction-disk 6, integral with or secured to the inner side of the web of each wheel and concentric to its hub.

7 designates brake-shoes which are placed in juxtaposition to each wheel-disk. The shoes also surround the wheel-hub, but do not contact therewith. The brake-shoes on the same side of the truck are coupled in pairs by means of a bar 8, preferably trussed, as shown in Fig. 1, to the opposite ends of which are secured arched shoe-supporting frames 8', to which the shoes 7 are detachably secured, as hereinafter described.

The brake-shoes 7 are in the form of an annular disk with an opening at the bottom to admit the axle of the truck central to the shoe, the outer face of the shoe being provided with a facing of indurated fiber for contacting with the wheel-disk and the inner sides with supporting-hooks 7' for securing it to the supporting-frame 8', and from opposite sides of the supporting-frame 8' in alinement with the bar 8 are projected oppositely the shanks 9 and 10, the shanks 9 being suitably secured to the bars 8 and the shanks 10 to the swinging stirrups 11, pendently secured to the ends 2 of the truck-frame. Stirrup 11 is formed by arms 12, having their upper ends pivoted to the ends 2 and their lower ends pivoted to opposite ends of the connecting cross-bar 13, the outer ends of the shanks 10 being secured to the connecting-bars 13 of each stirrup. The arms 12 are pivoted to swing in the vertical plane of the ends 2 of the truck-frame, whereby the brake-shoes 7 and their connecting-bar 8 are pivotally supported from the truck-frame and are adapted to move laterally from or toward the wheel-disks, but not lengthwise of the truck-frame.

The bars 8 on opposite sides of the truck are centrally of their length coupled together by the sectional extension-rod 14, comprising a central section 15, the end sections 16, and the coupling-sleeves 17. The ends of section 15 are either both right or both left threaded, and the inner ends of sections 16 are reversely threaded to the adjacent ends of section 15. The coupling-sleeves 17 are interiorly threaded to receive the reversely-threaded ends of the sections, each one-half the length of the sleeve, and are each provided with a radial lever-arm 18. The outer end of each section 16 is reduced in diameter to form a shoulder 19 and the reduced portion 20, which latter for a portion of its length is threaded for a nut, and the extreme outer ends 21 are squared for engagement by a wrench.

The bars 8 are each centrally of their length provided with an orifice 22 for the reduced portion 20 of the end sections 16 of the extension-rod, by which the latter is secured to the bars 8 by a nut run on the reduced portion 20. Thus coupled together the bars 8 may be adjusted to set the shoes 7 the desired distance from the wheel-disks by applying a wrench to the squared ends of sections 16 and running the sections in or out of the sleeves 17 the required distance. The bars 8 are provided with set-screws 23, extending into orifices 22, by which after adjustment of the bars 8 the sections 16 may be secured against turning in the bearings. The central section 15 of extension-rod 14 is also secured against rotation by a radial arm 24, secured to the section and extended through a slot 25 in a cross-bar 26, secured transverse the truck to the sides 1 of the truck-frame. Extension-rod 14 being thus secured to the bars 8, when either of the sleeves 17 are rotated in one direction by its lever-arm 18 the rod 14 will be extended or contracted, according to the direction of the movement of the lever, and the bars 8 will be simultaneously moved from or toward each other, according as the lever-arms 18 are moved in the direction to extend or contract rod 14. It is apparent that relative to each other the levers are required to be moved in opposite directions, either to extend the rod or to contract it, and that if both levers be operated at the same time in opposite directions the distance of extension or contraction will be doubled in the same distance of movement, and that either of said levers may be moved to extend or contract the rod without moving the other lever. It is apparent, also, that it is necessary to retract the brake-shoes 7 only a slight distance from their contact with the wheel-disks and that the pitch of the screw-threads may be such as to move the shoes to contact with the disks or retract them therefrom by only a fractional part of a revolution of the sleeves 17 in the extension-rod.

To prevent the jostling or swaying of the whole brake mechanism from its proper position to either side in contact with the disks, I have provided the chains 27, secured centrally to the bars 8 at one end, and threaded bolts 28 at the other end are run through orifices in the sides 1 of the truck-frame and secured by nuts on opposite sides thereof, by which the inward lateral movement of the bars 8 is limited and adjusted, while they are left free to be moved by the extension of the rod 14 to carry the shoes of both sides of the truck simultaneously into contact with the wheel-disks and to be withdrawn therefrom to the limit of the chains 27 by its contraction.

The lever-arms 18 are pivotally connected to bars or rods 29, which extend in opposite directions to and are pivotally connected to the levers 30, which are fulcrumed to the platforms of the car.

The sleeves 17 are adjusted to set the arms 18 at the same angle from the vertical on opposite sides of the rod 14 when the latter is contracted to the limit of the chains 27, which are so adjusted that the throw of either lever will move the shoes to contact with the disks. When both the levers 18 are thrown at the same time by the levers of both platforms, the brake-shoes will be set at half the throw required for a single lever and with twice the power. It is apparent, however, that the throw of one platform-lever will not cause the lever on the opposite platform to be operated, whereby danger to passengers on the platform and the necessity of detaching the levers and transferring them from one platform to the other when the direction of the car is reversed are avoided.

The frames 8' for supporting the shoes 7 are arched to conform to the upper halves of the shoes, and to opposite integral projections 31 are pivoted curved flattened arms 32, adapted, when the lower ends 33 are abutted, to complete the circle of the arch. The lower ends 33 of the arms 32 are provided with integral complementary bosses 34, perforated to receive the bolt 35 when the ends of the arms are abutted. When the bolt 35 is withdrawn, the arms swing outward by gravity.

In the top of the arch and in the inner edges of the arms are provided the incuts 36. To secure the shoes 7 to the supporting-frame 8', the supporting-hook 7' at the top of the shoe is inserted into the incut 36 at the top of the arch of the frame, with the hook engaging the back of the frame, and in that position the arms are brought together at their lower ends and fastened by bolt 35, with the hooks 7' on the lower arms of the shoe within the incuts 36 in the arms 32 and engaging the arms. Thus constructed the shoes 7 may therefore be readily attached and detached without removing the entire bar 8 and the frames 8'. It is apparent, however, that the shoes and bar may be made integral with the frame 8', and in Fig. 9 is shown a modification of the shoes in which the shoe-disks and bar are integral with the frames 8' and the arms 32 are omitted.

Preferably the platform-levers are set reversely to their respective arms 18, as shown in Fig. 2, whereby they are pulled to set the brakes. By so connecting the levers they do not interfere with the occupancy of the platform when not in use. For such connection the ends of the central section 15 are required to be left-threaded and the end sections right-threaded, as shown in Fig. 3. When, however, it is desired to set the brake by a push of the platform-lever, the threading of the sections is reversed.

What I claim to be new is—

1. In a car-brake, the combination with a truck-frame mounted on wheels having friction-disks on their inner webs concentric to their axles, of a pair of bars movably supported in parallel position between the wheels by the truck-frame, and having shoes secured thereto opposite each wheel-disk, concentrically to their axle; an extension-rod coupling the parallel bars, comprising a central and end sections, the center section being like threaded at both ends; and the inner ends of the end sections being reversely threaded to the adjacent ends of the middle section, and having their outer ends adapted to be coupled to the parallel bars; sleeves internally threaded for coupling the sections, each sleeve having a radial arm; means to couple the radial arms each to an operating-lever at opposite ends of the car; and means to prevent rotation of the middle and end sections of the extension-rod.

2. In a car-brake, the combination with a truck-frame mounted on wheels having friction-disks on their inner webs, concentric to their axles, of a pair of bars movably supported in parallel position between the wheels by the ends of the truck-frame, and having shoes secured thereto opposite each wheel-disk, concentrically to their axle; an extension-rod coupling the parallel bars, comprising a central and end sections, the center section being like threaded at both ends, and the inner ends of the end sections being reversely threaded to the adjacent ends of the middle section, and having their outer ends reduced in diameter and threaded; sleeves internally threaded for coupling the sections, each sleeve having a radial arm; orifices central to the bars adapted to receive the reduced ends of the middle sections; nuts for the threaded ends of the end sections adapted to secure the extension-rod thus formed to the bars; means to prevent rotation of the middle and end sections; a lever pivoted to each platform of the car and a link-rod connecting each lever with the arm of one of the sleeves.

3. In a car-brake, the combination with a truck-frame mounted on wheels having friction-disks on their inner webs, concentric to their axles, of a pair of trussed bars movably supported in parallel position between the wheels by stirrups pivoted to the ends of the truck-frame, and having shoes secured thereto opposite each wheel-disk, concentrically to their axle; an extension-rod coupling the parallel bars, comprising a central and end sections, the center section being like threaded at both ends, and the inner ends of the end sections being reversely threaded to the adjacent ends of the middle section, and having their outer ends adapted to be coupled to the parallel bars, sleeves internally threaded for coupling the sections, each sleeve having a radial arm; means to prevent rotation of the middle and end sections; means to couple the radial arms each to an operating-lever at opposite ends of the car respectively; and stay-chains connecting the parallel bars to the sides of the truck-frame adapted to adjustably limit the retraction of the bars.

4. In a car-brake mechanism, the combination with a shoe-supporting bar, having an arch for spanning the axle of a car-truck and provided with pendently-pivoted arms curved to complete the circle of the arch when their free ends are abutted, of an annular brake-shoe disk incut to admit the axle central thereto, and having hooks at the back adapted to engage the arms and arch and be held thereby when the arms are abutted and locked together.

5. In a car-brake, the combination with a truck-frame mounted on wheels having friction-disks on their inner webs, concentric to their axles, of a pair of bars movably supported in parallel position between the wheels by stirrups pivoted to the ends of the truck-frame, and having shoes secured thereto opposite each wheel-disk, concentrically to their axle; and means to laterally advance and retract the bars.

In witness whereof I have hereunto set my hand, this 9th day of November, A. D. 1901.

AUGUST W. VOLLSTORF.

Witnesses:
C. R. KONOPAK,
CHAS. A. BOAKE.